US012579964B2

(12) United States Patent
Hening et al.

(10) Patent No.: US 12,579,964 B2
(45) Date of Patent: Mar. 17, 2026

(54) ACOUSTIC ECHO SUPPRESSION AND CANCELLATION FOR WEB-BASED VIRTUAL MEETING PLATFORM

(71) Applicant: Double A Labs Corp., Austin, TX (US)

(72) Inventors: Pierce Hening, Emeryville, CA (US); Steve Morton, Kanata City (CA); Alexander Kanaris, San Jose, CA (US); Derrik Touve, Austin, TX (US); Amber Allen, Austin, TX (US); Aaron Murray, Pipe Creek, TX (US); Clint Cruson, Austin, TX (US); Chris Kim, Stephenville, TX (US); Ahna Boley, Austin, TX (US)

(73) Assignee: Amber Allen, Austin, TX (US)

( * ) Notice: Subject to any disclaimer, the term of this patent is extended or adjusted under 35 U.S.C. 154(b) by 136 days.

(21) Appl. No.: 18/608,328

(22) Filed: Mar. 18, 2024

(65) Prior Publication Data

US 2024/0321254 A1     Sep. 26, 2024

Related U.S. Application Data

(60) Provisional application No. 63/453,313, filed on Mar. 20, 2023.

(51) Int. Cl.
G10K 11/16     (2006.01)
G10K 11/178     (2006.01)
(Continued)

(52) U.S. Cl.
CPC .. G10K 11/17815 (2018.01); G10K 11/17873 (2018.01); G10L 19/012 (2013.01);
(Continued)

(58) Field of Classification Search
CPC .... H04M 3/002; H04M 9/082; G10L 21/0364
See application file for complete search history.

(56) References Cited

U.S. PATENT DOCUMENTS 8,553,520 B2     10/2013 Rajasekar et al.
9,489,963 B2     11/2016 Jazi et al.
(Continued)

OTHER PUBLICATIONS

Cheng, et al., "Deep learning-based stereophonic acoustic echo suppression without decorrelation," J. Acoust. Soc. Am., 2021. (Year: 2021).*

(Continued)

*Primary Examiner* — Feng-Tzer Tzeng
(74) *Attorney, Agent, or Firm* — NEO IP

(57)     ABSTRACT

A web-based virtual meeting platform with echo suppression functionality that is hardware agnostic. The platform is configured in a client-server distributed architecture, wherein a plurality of user devices are connected to a server. A baseline for audio generated by a user device on the client-side of the client-server platform is established. Upon detection of a deviation from the baseline, including electro acoustic feedback and ambient noise, suppressive gain is applied to the audio input at the client-side of the client-server architecture. The suppressed audio stream is then transmitted to a cloud server and distributed to a plurality of user devices connected to the cloud service. The platform is accessible via an internet browser and is non-discriminatory as to the hardware of the device used to access the platform. Further, the platform does not distribute data in a peer-to-peer architecture.

14 Claims, 6 Drawing Sheets

(51) Int. Cl.
  *G10L 19/012*   (2013.01)
  *H04L 65/403*   (2022.01)
  *G10L 21/0364*   (2013.01)

(52) U.S. Cl.
  CPC ............ *H04L 65/403* (2013.01); *G10K 11/16*
    (2013.01); *G10K 2210/108* (2013.01); *G10K*
      *2210/3027* (2013.01); *G10K 2210/3044*
    (2013.01); *G10K 2210/505* (2013.01); *G10L*
              *21/0364* (2013.01)

(56)      References Cited

U.S. PATENT DOCUMENTS

| | | | |
|---|---|---|---|
| 9,881,630 B2 | 1/2018 | Buchner et al. | |
| 11,501,791 B1 | 11/2022 | Briggs et al. | |
| 11,521,636 B1 * | 12/2022 | Slotznick ............ | G10L 21/0208 |
| 2018/0270565 A1 * | 9/2018 | Ganeshkumar ......... | G10L 25/84 |
| 2019/0238519 A1 * | 8/2019 | Bikumala ........... | H04L 63/0823 |
| 2021/0112157 A1 * | 4/2021 | Ferguson .............. | H04M 3/568 |
| 2022/0319530 A1 | 10/2022 | Moravy et al. | |
| 2023/0005469 A1 | 1/2023 | Kim et al. | |
| 2023/0186927 A1 * | 6/2023 | Zeghidour .......... | H03M 7/6029 |
| | | | 704/500 |

OTHER PUBLICATIONS

Cheng, et al. "Deep learning-based stereophonic acoustic echo suppression without decorrelation," J. Acoust. Soc. Am., 2021 (see attached reference in the first Office action). (Year: 2021).*

* cited by examiner

ACOUSTIC ECHO SUPPRESSION AND CANCELLATION FOR WEB-BASED VIRTUAL MEETING PLATFORM

CROSS REFERENCES TO RELATED APPLICATIONS

This application claims priority to and the benefit of U.S. Provisional Application No. 63/453,313, filed Mar. 20, 2023, which is incorporated herein by reference in its entirety.

BACKGROUND OF THE INVENTION

1. Field of the Invention

The present invention relates to echo suppression and cancellation within a virtual meeting platform, and more specifically to the suppression and cancellation of echo within a web browser on the client-side of a client-server platform and the localization of audio on the server-side of a client-server platform.

2. Description of the Prior Art

It is generally known in the prior art to provide noise suppression for audio communication between devices.

Prior art patent documents include the following:

US Patent Pub. No. 2023/0005469 for Method and system for speech detection and speech enhancement by inventors Kim et al., filed Jun. 29, 2022 and published Jan. 5, 2023, is directed to a method of speech detection and speech enhancement in a speech detection and speech enhancement unit of Multipoint Conferencing Node (MCN) and a method of training the same. The method comprising receiving input audio segments, and determining an acoustic environment based on input audio auxiliary information, extracting T-F-domain features from the received input audio segments, determining if each of the received input audio segments is speech by inputting the T-F domain features into a speech detection classifier trained for the determined acoustic environment, determining, when one of the received input audio segments is speech, if the received audio segment is noisy speech by inputting the T-F domain features into a noise classifier using a statistical generative model representing the probability distributions of the T-F domain features of noisy speech trained for the determined acoustic environment, and applying a noise reduction mask on the received input audio segments according to the determination of the received audio segment is noisy speech.

U.S. Pat. No. 11,521,636 for Method and apparatus for using a test audio pattern to generate an audio signal transform for use in performing acoustic echo cancellation by inventor Slotznick, filed on Aug. 29, 2022 and issued Dec. 10, 2022, is directed to a test audio pattern sent to the speaker of the participant computer for outputting by the speaker. A computer receives a microphone input signal from the participant computer that includes the test audio pattern outputted by the speaker of the participant computer, and any ambient noise picked up by the speaker of the participant computer. Ambient noise suppression is performed to cancel out any ambient noise in the microphone input signal picked up by the speaker of the participant computer. The test audio pattern sent to the speaker of the participant computer is compared with the noise-suppressed microphone input signal which includes the test audio pattern outputted by the speaker of the participant computer.

An audio signal transform is generated from the comparison. The generated audio signal transform is subsequently used for performing acoustic echo cancellation of streaming audio received from the microphone input signal when the participant computer receives streaming audio and the participants engage in remote audio communications with each other.

U.S. Pat. No. 11,501,791 for Loopback audio channels for echo cancellation in web browsers by inventors Briggs et al., filed Nov. 22, 2021 and issued Dec. 26, 2022, is directed to media, methods, and systems for audio rerouting to echo cancel audio in web browsers hosting video streams. Spoken audio from a presenter in a video stream may be received via a microphone on a presenter computing device using a first audio connection. Echo cancellation for the presenter may be enabled. Media audio from the presenter may be received originating from a second audio connection. In response to receiving the media audio, a loopback connection for the presenter may be created. In the loopback connection, the presenter may act as both the sender and receiver of the media audio. The loopback connection may have echo cancellation enabled and use the first audio connection. Once the loopback connection is created, the audio may be routed through the loopback connection. The audio may then be played out of an audio output device for the presenter with echo cancellation enabled.

U.S. Pat. No. 8,553,520 for System and method for echo suppression in web browser-based communication by inventors Rajasekar et al., filed Feb. 25, 2011 and issued Sep. 18, 2013, is directed to a system and method for performing echo suppression on a server in browser-based online audio conferences without downloading or installing software on a participant's computing device is disclosed. Streams of audio communication data from the participants in an audio conference are received at the server. An echo suppression application determines the first party that speaks by analyzing the streams to locate speech data, and assigns that party as the "owner" of the audio channel. The speech data is sent to the other participants in the conference. The application then determines whether newly received audio from the owner of the channel is new speech; if so, then the party remains the owner of the channel, and the new speech data is also sent to the other parties in the conference. The channel is surrendered if no new speech is received from the owner in a defined period, and the next party that speaks becomes the new owner of the channel. The other audio data from the participants is replaced by silence.

US Patent Pub. No. 2022/0319530 for Systems and methods for integrated conferencing platform by inventors Moravy et al., filed Mar. 11, 2022 and issued Oct. 6, 2022, is directed to a software-based conferencing platform. The platform comprises a plurality of audio sources providing input audio signals, the audio sources including a virtual audio device driver configured to receive far-end input audio signals from a conferencing software module, and a network audio library configured to receive near-end input audio signals from one or more near-end audio devices. The platform further comprises a digital signal processing component configured to receive the input audio signals from the audio sources and generate audio output signals based the received signals, the digital signal processing component comprising an acoustic echo cancellation module configured to apply acoustic echo cancellation techniques to one or more of the near-end input audio signals.

U.S. Pat. No. 9,881,630 for Acoustic keystroke transient canceler for speech communication terminals using a semi-blind adaptive filter model by inventors Buchner et al., filed Dec. 30, 2015 and issued Jan. 10, 2018, is directed to methods and systems for acoustic keystroke transient cancellation/suppression for user communication devices using a semi-blind adaptive filter model. The methods and systems are designed to overcome existing problems in transient noise suppression by taking into account some less-defective signal as side information on the transients and also accounting for acoustic signal propagation, including the reverberation effects, using dynamic models. The methods and systems take advantage of a synchronous reference microphone embedded in the keyboard of the user device, and utilize an adaptive filtering approach exploiting the knowledge of this keyboard microphone signal.

U.S. Pat. No. 9,489,963 for Correlation-based two microphone algorithm for noise reduction in reverberation by inventors Jazi et al., filed Mar. 16, 2015 and issued Nov. 8, 2016, is directed to providing speech enhancement of audio signals from a target source and noise reduction of audio signals from a noise source. A coherence between a first audio signal from a first microphone and a second audio signal from a second microphone may be determined. A first gain function may be determined based on real components of a coherence function, wherein the real components include coefficients based on the previously determined coherence. A second gain function may be determined based on imaginary components of the coherence function. And a third gain function may be determined based on a relationship between a real component of the coherence function and a threshold range. An enhanced audio signal may be generated by applying a combination of the first gain function, the second gain function, and the third gain function to the first audio signal.

SUMMARY OF THE INVENTION

The present invention relates to a web-based system for echo suppression, where audio is processed within a browser on the client device before being sent to the server and distributed to participants of a virtual meeting.

It is an object of this invention to provide a hardware agnostic echo suppression system for a web based virtual meeting platform for increased quality and scale of virtual meetings. The prior art establishes connections between each device of a distributed network in a peer-to-peer system and requires hardware implementations and software downloads to enable echo suppression in virtual meetings. The present invention is an in-browser echo suppression system that does not require peer-to-peer connections, installation of specific hardware, or a specific software download.

In one embodiment, the present invention is a hardware agnostic system for suppression of an echo within a virtual meeting platform, including a server with a server processer, a server memory with a server database, and an operating system, a plurality of client devices, wherein each client device of the plurality of client devices includes a client processor and a client memory with a client database, wherein the server hosts a platform with a graphic user interface (GUI) and a client-server computing infrastructure, wherein each client device of the plurality of client devices is configured to access the server via a web browser, wherein upon accessing the server via the web browser each client device of the plurality of client devices is configured to access the platform, wherein the server establishes a connection between each client device of the plurality of client devices via the platform, wherein the platform receives an environmental audio input from a first client device of the plurality of client devices and converts the environmental audio input into a reference signal on a client side of the client-server computing infrastructure, wherein the platform receives a microphone audio input from the first client device and converts the microphone audio input into a microphone audio signal on the client side of the client-server computing infrastructure, wherein the platform compares the reference signal to the microphone audio signal and identifies at least one derivation between the reference signal and the microphone audio signal on the client side of the client-server computing infrastructure, wherein the platform identifies a subset of digital samples of the derivation and a gain value, wherein the platform multiplies the subset of digital samples by the gain value on the client side of the client-server computing infrastructure to produce a suppressed audio stream, wherein the platform transmits the suppressed audio stream from the client side of the client-server computing infrastructure to a server side of the client-server computing infrastructure, and wherein the server transmits the suppressed audio stream to a second client device of the plurality of client devices.

In another embodiment, the present invention is a hardware agnostic method for suppression of an echo within a virtual meeting platform, including a server hosting a platform with a graphic user interface (GUI) and a client-server computing infrastructure, wherein the server includes a server processer, a server memory with a server database, and an operating system, a plurality of client devices accessing the server via a web browser, wherein each client device of the plurality of client devices includes a client processor and a client memory with a client database, the server establishing a connection between each client device of the plurality of client devices via the platform, a first client device of the plurality of client devices accessing the platform, wherein a first avatar is generated by the platform, a second client device of the plurality of client devices accessing the platform, wherein a second avatar is generated by the platform, the platform displaying the first avatar and the second avatar on the GUI of the platform, the platform receiving an environmental audio input from a first client device of the plurality of client devices and converting the environmental audio input into a reference signal on a client side of the client-server computing infrastructure, the platform receiving a microphone audio input from the first client device and converting the microphone audio input into a microphone audio signal on the client side of the client-server computing infrastructure, the platform comparing the reference signal to the microphone audio signal and identifying at least one derivation between the reference signal and the microphone audio signal on the client side of the client-server computing infrastructure, the platform identifying a subset of digital samples of the derivation and a gain value, the platform multiplying the subset of digital samples by the gain value on the client side of the client-server computing infrastructure to produce a suppressed audio stream, the platform transmitting the suppressed audio stream from the client side of the client-server computing infrastructure to a server side of the client-server computing infrastructure, the server transmitting the suppressed audio stream to a second client device of the plurality of client devices, and the platform determining a volume level for the suppressed audio stream based on a displayed proximity of the first avatar to the second avatar.

In yet another embodiment, the present invention is a hardware agnostic system for suppression of an echo within a virtual meeting platform, including a server with a server processer, a server memory with a server database, and an operating system, a plurality of client devices, wherein each client device of the plurality of client devices includes a client processor and a client memory with a client database, wherein the server hosts a platform with a graphic user interface (GUI), a codec, and a client-server computing infrastructure, wherein each client device of the plurality of client devices is configured to access the server via a web browser, wherein upon accessing the server via the web browser each client device of the plurality of client devices is configured to access the platform, wherein the server establishes a connection between each client device of the plurality of client devices via the platform, wherein the platform receives an environmental audio input from a first client device of the plurality of client devices and converts the environmental audio input into a reference signal on a client side of the client-server computing infrastructure, wherein the platform receives a microphone audio input from the first client device and converts the microphone audio input into a microphone audio signal on the client side of the client-server computing infrastructure, wherein the platform compares the reference signal to the microphone audio signal and identifies at least one derivation between the reference signal and the microphone audio signal on the client side of the client-server computing infrastructure, wherein the platform identifies a subset of digital samples of the derivation and a gain value, wherein the platform multiplies the subset of digital samples by the gain value on the client side of the client-server computing infrastructure to produce a suppressed audio stream, wherein the platform is configured to identify a soundwave of the microphone audio signal and/or the reference signal, wherein the platform is configured to add a shifted soundwave to the microphone audio signal and/or the reference signal to produce a cancelled audio stream, wherein the codec compresses the suppressed audio stream or the cancelled audio stream on the client side of the client-server computing infrastructure, wherein the platform transmits a compressed suppressed audio stream or a compressed cancelled audio stream from the client side of the client-server computing infrastructure to a server side of the client-server computing infrastructure, wherein the server transmits the compressed suppressed audio stream or the compressed cancelled audio stream to a second client device of the plurality of client devices, and wherein the codec decompresses the compressed suppressed audio stream or the compressed cancelled audio stream on the client side of the client-server computing infrastructure.

These and other aspects of the present invention will become apparent to those skilled in the art after a reading of the following description of the preferred embodiment when considered with the drawings, as they support the claimed invention.

DETAILED DESCRIPTION

Figure 1:
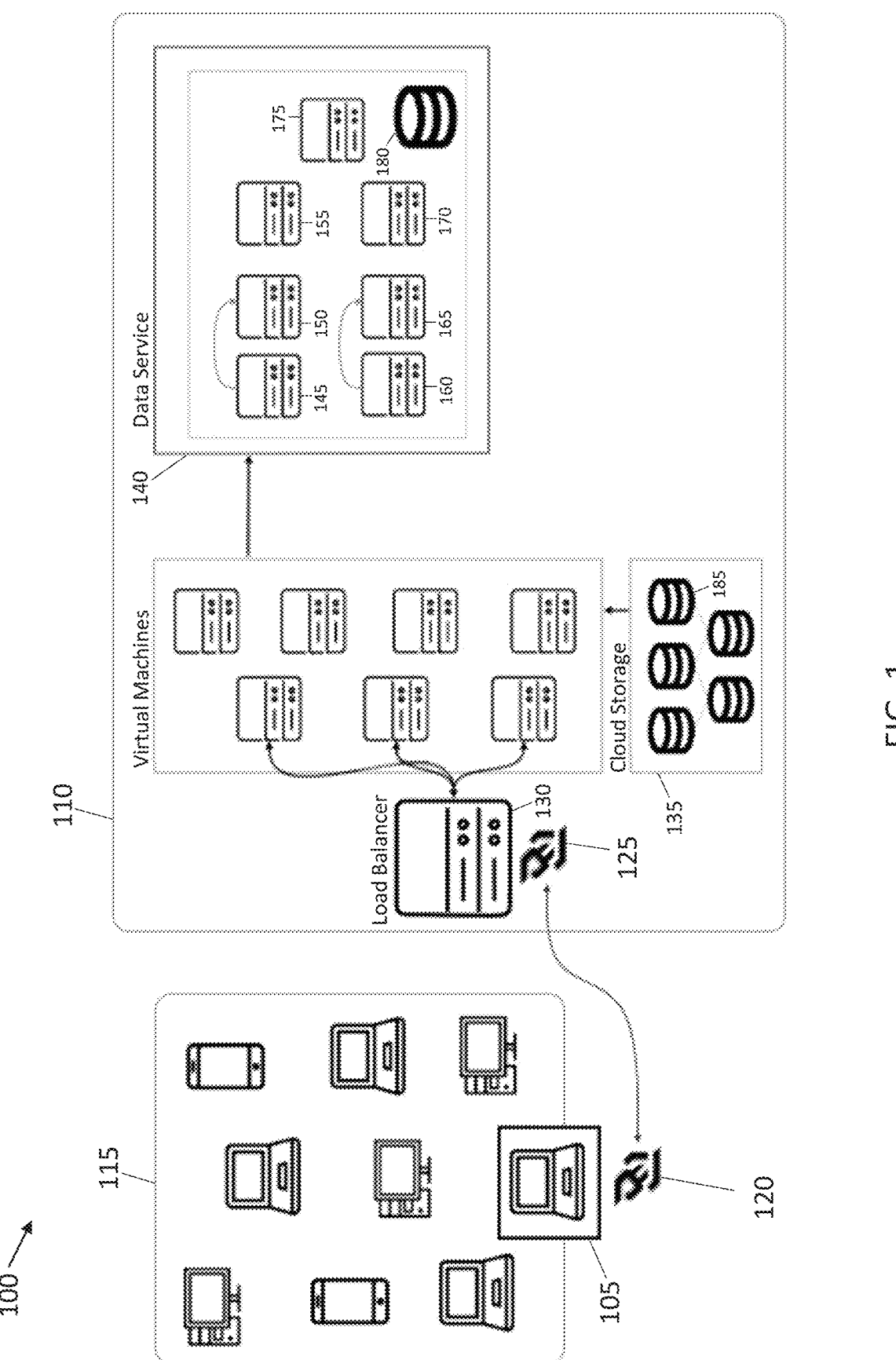
FIG. 1 is a schematic diagram of a system of the present invention.

The present invention is generally directed to a web-based system for echo suppression, where audio is processed within a browser on the client device before being sent to the server and distributed to participants of a virtual meeting.

In one embodiment, the present invention is a hardware agnostic system for suppression of an echo within a virtual meeting platform, including a server with a server processer, a server memory with a server database, and an operating system, a plurality of client devices, wherein each client device of the plurality of client devices includes a client processor and a client memory with a client database, wherein the server hosts a platform with a graphic user interface (GUI) and a client-server computing infrastructure, wherein each client device of the plurality of client devices is configured to access the server via a web browser, wherein upon accessing the server via the web browser each client device of the plurality of client devices is configured to access the platform, wherein the server establishes a connection between each client device of the plurality of client devices via the platform, wherein the platform receives an environmental audio input from a first client device of the plurality of client devices and converts the environmental audio input into a reference signal on a client side of the client-server computing infrastructure, wherein the platform receives a microphone audio input from the first client device and converts the microphone audio input into a microphone audio signal on the client side of the client-server computing infrastructure, wherein the platform compares the reference signal to the microphone audio signal and identifies at least one derivation between the reference signal and the microphone audio signal on the client side of the client-server computing infrastructure, wherein the platform identifies a subset of digital samples of the derivation and a gain value, wherein the platform multiplies the subset of digital samples by the gain value on the client side of the client-server computing infrastructure to produce a suppressed audio stream, wherein the platform transmits the suppressed audio stream from the client side of the client-server computing infrastructure to a server side of the client-server computing infrastructure, and wherein the server transmits the suppressed audio stream to a second client device of the plurality of client devices.

In another embodiment, the present invention is a hardware agnostic method for suppression of an echo within a virtual meeting platform, including a server hosting a platform with a graphic user interface (GUI) and a client-server computing infrastructure, wherein the server includes a server processer, a server memory with a server database, and an operating system, a plurality of client devices accessing the server via a web browser, wherein each client device of the plurality of client devices includes a client processor and a client memory with a client database, the server establishing a connection between each client device of the plurality of client devices via the platform, a first client device of the plurality of client devices accessing the platform, wherein a first avatar is generated by the platform, a second client device of the plurality of client devices accessing the platform, wherein a second avatar is generated by the platform, the platform displaying the first avatar and the second avatar on the GUI of the platform, the platform receiving an environmental audio input from a first client device of the plurality of client devices and converting the environmental audio input into a reference signal on a client side of the client-server computing infrastructure, the platform receiving a microphone audio input from the first client device and converting the microphone audio input into a microphone audio signal on the client side of the client-server computing infrastructure, the platform comparing the reference signal to the microphone audio signal and identifying at least one derivation between the reference signal and the microphone audio signal on the client side of the client-server computing infrastructure, the platform identifying a subset of digital samples of the derivation and a gain value, the platform multiplying the subset of digital samples by the gain value on the client side of the client-server computing infrastructure to produce a suppressed audio stream, the platform transmitting the suppressed audio stream from the client side of the client-server computing infrastructure to a server side of the client-server computing infrastructure, the server transmitting the suppressed audio stream to a second client device of the plurality of client devices, and the platform determining a volume level for the suppressed audio stream based on a displayed proximity of the first avatar to the second avatar.

In yet another embodiment, the present invention is a hardware agnostic system for suppression of an echo within a virtual meeting platform, including a server with a server processer, a server memory with a server database, and an operating system, a plurality of client devices, wherein each client device of the plurality of client devices includes a client processor and a client memory with a client database, wherein the server hosts a platform with a graphic user interface (GUI), a codec, and a client-server computing infrastructure, wherein each client device of the plurality of client devices is configured to access the server via a web browser, wherein upon accessing the server via the web browser each client device of the plurality of client devices is configured to access the platform, wherein the server establishes a connection between each client device of the plurality of client devices via the platform, wherein the platform receives an environmental audio input from a first client device of the plurality of client devices and converts the environmental audio input into a reference signal on a client side of the client-server computing infrastructure, wherein the platform receives a microphone audio input from the first client device and converts the microphone audio input into a microphone audio signal on the client side of the client-server computing infrastructure, wherein the platform compares the reference signal to the microphone audio signal and identifies at least one derivation between the reference signal and the microphone audio signal on the client side of the client-server computing infrastructure, wherein the platform identifies a subset of digital samples of the derivation and a gain value, wherein the platform multiplies the subset of digital samples by the gain value on the client side of the client-server computing infrastructure to produce a suppressed audio stream, wherein the platform is configured to identify a soundwave of the microphone audio signal and/or the reference signal, wherein the platform is configured to add a shifted soundwave to the microphone audio signal and/or the reference signal to produce a cancelled audio stream, wherein the codec compresses the suppressed audio stream or the cancelled audio stream on the client side of the client-server computing infrastructure, wherein the platform transmits a compressed suppressed audio stream or a compressed cancelled audio stream from the client side of the client-server computing infrastructure to a server side of the client-server computing infrastructure, wherein the server transmits the compressed suppressed audio stream or the compressed cancelled audio stream to a second client device of the plurality of client devices, and wherein the codec decompresses the compressed suppressed audio stream or the compressed cancelled audio stream on the client side of the client-server computing infrastructure.

None of the prior art discloses a platform for virtual meetings with a client-server distributed network, wherein echo is suppressed on the client side of the network, wherein the distributed network does not implement peer-to-peer connections. The use of peer-to-peer connections limits the quality of the audio and video streams generated by a participant device based on the amount of people within the virtual meeting space. More people in a peer-to-peer meeting space requires the establishment of exponentially more connections, as each device is connected to every other device within the network. This not only impacts the quality of the data stream, but also limits the number of participants available to actively engage with each other on the platform.

Additionally, echo or noise suppression or elimination is typically achieved on the server side of a client-server network. There are difficulties in utilizing an in-browser echo suppression system, including lack of information about the acoustic environment and the processing power of the server. In contrast to the prior art, which operates on the server side of a client-server network to suppress or eliminate noise or echo, the present invention overcomes the difficulties of implementing echo suppression on the client side of a client-server network using only the resources locally available in a client browser. Additionally, the suppression of extraneous audio data within a client browser decreases the volume of data sent to the server for distribution to other browsers. As less data is required to be transmitted to the server from the client device, the network connection is operable to accommodate more devices in comparison to systems wherein unfiltered data is sent directly to the server before processing and distribution.

Further still, prior art is dependent upon the type of device to establish a connection between devices (e.g., telephony communications). Similarly, prior art platforms require software download and installation in order to establish connections between devices and a server and/or other devices. The in-browser suppression of the present invention allows for an entirely hardware agnostic and software agnostic system. The system of the present invention eliminates this requirement by creating an entirely browser-based platform that suppresses echo within the browser, and does not require a software download or update to operate. Because there is no required download, hardware installation, or software update specific to the system required to enable use of the platform, the present invention provides for rapid accessibility to a broad range of devices and users using a wide variety of web browsers.

With the increasing popularity of virtual communication, a need has arisen for a virtual communication platform that connects large numbers of users without compromising the audio and/or visual quality of the data stream. For example, a significant portion of businesses have transitioned to offer an online element to prevent the need for in-person communication. In this remote work structure, employees are not required to meet within a physical environment to effectively communicate. Rather, employees attend virtual meetings to connect with clients and coworkers, as well as to coordinate on projects and participate in training. However, these meetings are limited in scale and quality, as only a small number of users may attend a meeting and communicate within the platform due to the network architecture and where audio processing traditionally occurs. Users attending such meetings are limited to speaking only one at a time as the system prioritizes the audio of one user over other users.

Further, a meeting with multiple users creates a feedback loop of audio, herein referred to as an echo, wherein the audio transmitted by a first user is played through the speaker of a second user. The second user's microphone picks up the sound and transmits the audio back to the device of the first user. In this way, an echo is generated when a user speaks. This audio disruption is detectable to all attendees and is an annoying discontinuity. Prior art systems seek to eliminate this echo by automatically muting participant users upon entering a virtual meeting platform or limiting the number of users who are able to transmit audio to other participants (e.g., an event in a virtual meeting room where a presenter is the only one with audio transmission capabilities). While the echo is eliminated using these methods, participant users are unable to communicate in an effective and timely manner. This limits the flexibility and usefulness of the virtual meeting spaces as well as the efficiency of communication.

Live events such as concerts, university lectures, technology development showcases, public seminars, community meetings, and other highly attended events typically enable attendees sitting within a certain proximity to communicate with each other, and provide for attendees to engage with a speaker or presenter. In this way, students attending lectures can clarify questions while the presenter is speaking, or two fans of the same band can speak to each other at a concert. However, current virtual meeting platforms transmit audio in an all-or-nothing system, wherein audio generated by a first user is sent to all users within the network. This limits the communication options of current platforms to either enable or disable audio transmission for attending users. For live events, enabling audio transmission for all users would be disruptive, as users would then speak over the host or presenter. Some prior art seeks to rectify this by creating breakout rooms for a subset of participant users, wherein a select group of users can speak to each other without disrupting the main meeting. However, these breakout rooms are created by the meeting host, limiting the availability of breakout options within a virtual meeting and creating an additional administrative task. Entering a breakout room also requires a user to leave the main presentation or gathering (i.e., leave a lecture to enter a breakout room with a classmate to clarify a question asked by a professor). The system of the present invention advantageously creates the ability for users to transmit audio to and receive audio from a subset of a large group based on proximity to other users within a virtual meeting room by suppressing audio within a virtual meeting environment before the audio is transmitted to a server or another browser on another device. In this way, users are not required to leave a meeting in order to selectively transmit audio to another specific user or a subset of users. This allows for coordination of work and clarification of concepts in real time with other participants rather than disrupting the presenter to ask a question, which would then be transmitted to every user within the network of prior art systems.

Further still, the peer-to-peer network distribution model limits the quality of transmitted data and reduces the scalability of the platform. The system of the present invention advantageously uses a client-server distributed architecture, wherein the server is operable to selectively transmit the streamed audio and video data to devices within a network. As more users join a virtual meeting platform, the connections between devices must transmit more data and therefore audio and/or video streaming quality decreases. Thus, the present invention solves the need for a hardware agnostic system for large-scale virtual meeting streaming while maintaining audio and video quality for users and, further, for a virtual meeting platform that allows multiple users to speak in real time while echo is suppressed and noise levels within the virtual meeting platform are reduced. The system of the present invention solves this problem by avoiding the traditional and widely used peer-to-peer distributed architecture for data communication and, further, by processing data within a browser to suppress an echo generated by a client device before the data is sent to a server for distribution. The present invention provides audio byte stream processing for high-quality, low-bandwidth audio and video communication in a browser-based hybrid server-authoritative architecture where echo suppression is performed on a client device and audio amplification or suppression is performed on a server computer.

Referring now to the drawings in general, the illustrations are for the purpose of describing one or more preferred embodiments of the invention and are not intended to limit the invention thereto.

A graphical user interface, referred to herein as a GUI, of a user computing device accesses the web-based platform of the present invention. As used herein, "platform" refers to a computer software code accessible via a browser, with an associated computing infrastructure, such as cloud computing infrastructure, one or more server computers, or one or more edge devices. The platform is operable to be accessed via a web browser, an internet browser, or any other software with internet connectivity functionality capable of implementing the invention disclosed herein. Accessing the browser by the user GUI establishes a user connection. One of ordinary skill in the art will appreciate that a client-server computing architecture comprises a client device and a server, where the "client-side" of the architecture refers to the functions of the platform at the point of the user device and the "server-side" refers to the functions of the platform accomplished at the server or analogous device, such as an edge device. As used herein, "server-side" refers to the cloud service or other computing infrastructure service of the platform of the present invention.

FIG. 1 is a schematic diagram of a system of the present invention. A user GUI device 105 accesses the platform 100 of the present invention. Upon accessing the platform, the user device establishes a connection to the cloud service 110. A group communication connection 115 is established wherein a plurality of user GUI devices access the same virtual meeting space within the platform and receive data from the cloud service 110 that is transmitted by another user device within the group communication connection. Data generated by a user GUI device 105 is transmitted via a communications protocol such as WEBSOCKET 120, 125 from the user device to the cloud service 110. A load balancer of the cloud service 110 receives the data and distributes the data to one or more virtual machines. Each virtual machine is connected to a cloud storage environment 135 with cache memory 185 for storage and retrieval of data. Further, each virtual machine transmits data to the data service 140 (e.g., a cloud server). The data service 140 includes a plurality of virtual machines 145, 150, 155, 160, 165, 170, and 175 (e.g., data storage servers).

The virtual machines 145, 150, 155 manage the cloud log data. A virtual machine 145 processes and stores primary log data and transmits the log data to a virtual machine 150 to archive (i.e., store) the data upon determination that the data has not been recently used. Another virtual machine 155 stores and manages log data set aside for deletion (i.e., "trash"). The virtual machines 160, 165, 170 also manage active data to be stored within a database. Virtual machine 160 processes primary active data within the database and transmits the data to a virtual machine 165 for archiving the data within the database upon determination that the data has not been recently used. Another virtual machine 170 manages database data set aside for deletion (i.e., "trash"). Still another virtual machine 175 manages read-only data within the database. A cache 180 is used to store data within the data service 140.

The platform of the present invention advantageously establishes a group communication connection between multiple user devices. In one embodiment, the group communication connection is not a peer-to-peer distributed architecture. One of ordinary skill in the art will appreciate that a peer-to-peer distributed architecture establishes connections between each device of a communication network, requiring data to be sent from one user device to each device within the network. A peer-to-peer distributed architecture maximizes the amount of data transmitted by the user device over the connection, creating contention for resources, increasing transmission delays and packet loss rate as more devices join the network. For this reason, peer-to-peer distributed architectures are limited in the amount of user devices the network is operable to accommodate. The present invention advantageously utilizes a client-server distributed architecture, where data gathered on the user device is transmitted to a cloud server. The server then distributes the data to each client device within the group communication connection. This allows for increased transmission capabilities and therefore increases the number of user devices operable to be accommodated by the platform of the present invention. By utilizing a client-server architecture, the present invention eliminates or significantly reduces issues commonly encountered in a peer-to-peer architecture, such as buffering or latency. These issues arise in peer-to-peer environments because of the many connections that must be formed between devices when more than two devices are communicating over this architecture. By establishing a connection from each client device directly to a server, the present invention avoids these buffering and latency issues.

In one embodiment, the platform of the present invention is operable to accommodate as few as one user GUI device. In one embodiment, the platform of the present invention is operable to accommodate as many as 100 user GUI devices. In one embodiment, the platform of the present invention is operable to accommodate as many as 500 user GUI devices. In one embodiment, the platform of the present invention is operable to accommodate as many as 2,000 user GUI devices. In one embodiment, the platform of the present invention is operable to accommodate as many as 10,000 user GUI devices. In one embodiment, the platform of the present invention is operable to accommodate as many as 100,000 user GUI devices. In yet another embodiment, there is no practical limit to the number of user GUI devices the present invention is operable to accommodate. One of ordinary skill in the art will appreciate that the scalability and streaming speed provided by the platform of the present invention exceeds that of platforms for virtual meetings known in the art. The present platform meets the long-felt unmet need for a virtual meeting platform that connects thousands of users and, further, enables users to speak to each other without interference from electro acoustic feedback.

In one embodiment of the present invention, a user GUI device is operable to store data within the web-based platform. The user GUI device is further operable to transmit data to the cloud service. In one embodiment, a user GUI device is operable to encrypt and protect both audio and visual data through the use of security encryption software, such as Web Services Security (WSS), to ensure privacy and security of data within the platform. The encryption establishes an end-to-end communication protocol, such as WEB-SOCKET, on the user GUI device end and the cloud service end of the system. The communication protocol enables secured transmission of encrypted data from the client-side to the server-side of a client-server distributed architecture. The end-to-end encryption connection transmits data relating to the audio stream, video stream, movements of an avatar within the virtual meeting space, audio ring buffer, and custom content from one end at the user GUI device to another end at the cloud service. One of ordinary skill in the art will appreciate that data transmission is not limited in the type or content of data transmitted via the end-to-end encryption connection.

The data is received by a load balancer within the cloud service. In one embodiment, the cloud service includes Amazon Web Services (AWS) or a cloud service with equivalent functionality. The load balancer of the cloud service includes an observer component and a controller component. The observer component measures the data flow between virtual machines (VM) and evaluates the workload expected from each VM. In one embodiment, the VM is a server. In one embodiment, the VM is a cloud server. The controller component manages data flow and the amount of work assigned to each VM. In this way, the load balancer is operable to direct client-to-server traffic to a specific virtual machine and ensure that each VM will not be overloaded with processing tasks or data. The load balancer decrypts the data and transmits the decrypted, compressed stream to a plurality of virtual machines within the cloud service. This data disbursement enables the transmission of significantly more data than is possible using a peer-to-peer system, as the load balancer ensures that the virtual machines are not overloaded by streamed data. As data is dispersed and processed by each virtual machine, more data is operable to be received via the group communication connection. This is additionally advantageous for shutting down one or more virtual machines to further reduce system delays or perform maintenance on the virtual machine (i.e., updating software of the virtual machine) while still allowing users to connect to a virtual machine instance. Further, the system of the present invention is operable to direct user traffic to a server that is geographically proximal to a user device for reduced transmission delay.

In one embodiment, each virtual meeting space is equipped with a corresponding virtual machine for storage of data corresponding to the virtual meeting space. In one embodiment, each virtual meeting space is assigned to a specific virtual machine (VM), and data relating to the specific virtual meeting space is sent to the VM from the user GUI devices connected to the specific virtual meeting space. In one embodiment, the virtual machine is a server or a cloud server. One of ordinary skill in the art will appreciate that the platform of the present invention is operable to store a plurality of virtual meeting spaces specific to individual customers on individual VMs specific to the customer. For example, Customer ABC creates virtual meeting space ABC, with custom rooms, features, and functions according to one embodiment of the present invention. Customer XYZ creates virtual meeting space XYZ, with custom rooms, features, and functions according to one embodiment of the present invention. Virtual meeting space ABC and virtual meeting space XYZ are stored on two separate virtual machines according to one embodiment of the present invention. In one embodiment of the present invention, a virtual meeting space is operable to be stored on multiple VMs specific to the customer associated with the virtual meeting space. In one embodiment of the present invention, multiple virtual meeting spaces are operable to be associated with a single customer.

The server manages the browser environment of the platform of the present invention. In one embodiment, the features of the browser environment disclosed herein (e.g., customized meeting rooms, avatars, room IDs) are stored on the server. Additionally, the server processes actions and data relating to the user, including but not limited to movement of a user avatar within the space, interaction between users, audio data, and video data. The processed results are then sent to the GUI device of a user, where they are displayed. In one embodiment, server-side audio and video data processing is minimal, consisting of limiting audio and video data rates server-to-client to optimize user performance. In one embodiment, user accessible features associated with a virtual meeting space, audio capture and processing, video capture and processing, audio rendering of signals coming from user GUI devices of remote users and video rendering of signals from user GUI devices of remote users are processed within the web browser of each user GUI device connected to the server of the system. In one embodiment, the server is operable to send and receive data from the data service, including session data and user data.

In one embodiment, the data service is operable to store active data for a short term and archive data for long term data storage. The data service is further operable to manage data set aside for deletion. The data service manages data for both a cloud log of the platform and a database of the platform. The cloud log data contains and stores information associated with events relating to the operation of the platform (e.g., user statistics, network activity), while the database data contains and stores information associated with user-generated data and user interaction with the platform (e.g., avatar movement within the platform). The platform is further operable to store active data, which is data that is used frequently (e.g., user information, room information). Log data, active data, and database data all contain the primary data which has been used recently, the archive data which has not been used recently and may be used in the future, and trash data which is marked for deletion and will not be used in the future. The data service further includes the use of a cache for storage of data including but not limited to session and user data. In one embodiment, the cache is a REDIS data structure cache or a cache with similar functionality.

In one embodiment, the platform of the present invention includes cloud storage for storing objects and managing data relating to the platform and the streamed data. In one embodiment, the cloud storage is an object storage service for objects (e.g., files). The use of this cloud storage is advantageous, as users are able to access the stored data from any device via the web-based platform. In one embodiment, the cloud storage is AWS S3 cloud storage. In one embodiment, the cloud storage service stores data relating to the platform including code, files, customized data, and personalized content displayed on the web interface of the platform. In one embodiment, the cloud storage stores data relating to a user's personal data within the web interface (e.g., a username). In one embodiment, the data service stores data relating to a user's personal data within the web interface (e.g., a username).

The system of the present invention comprises a variety of storage and processing components (e.g., load balancer and cloud storage) operable to partition the storage and processing of data. One of ordinary skill in the art will appreciate that the allocation of resources and specific storage and processing components are not considered limiting as to the function of the invention. For example, in one embodiment of the present invention, the load balancer is operable to transmit data directly to a server rather than to a VM. Additionally, the system of the present invention is operable to decrypt data at a virtual machine rather than at a load balancer of a cloud service in one embodiment of the present invention.

In one embodiment, the system of the present invention receives an audio input of the environment of a user generated by a microphone of a user GUI device. This environmental audio input is converted to an electric signal, which is a sequence of digital samples, and is referred to herein as the reference signal. A sound wave captured by the microphone of a user GUI device (i.e., microphone audio data) while the platform is in use is also converted to an electric signal (i.e., a microphone audio signal). Derivations between the reference signal and the microphone audio signal are effectively suppressed by multiplying a certain subset of digital samples of the microphone audio signal by a gain value that is either zero or very close to zero. An echo suppression algorithm identifies the subset of digital samples which require suppression and the gain value by which the subset is multiplied. The term "echo" as used herein refers to a sound that is present in the signal rendered by the speaker of a user GUI device and is also present in the signal captured by the microphone of the same user GUI device and transmitted to other user GUI devices. This is also known as feedback, electro acoustic variance, acoustic feedback, and acoustic variance.

The system of the present invention is operable to identify an echo within the microphone audio signal by performing an algorithmic analysis and comparison of the signal rendered by the loudspeaker of a user GUI device to the signal captured by the microphone of the same user GUI device. The algorithm considers a variety of factors alone and in combination in order to determine the likelihood that a digital sample is an echo. In one embodiment, the algorithm evaluates the degree of signal similarity between the signal rendered by the loudspeaker of a user GUI device to the signal captured by the microphone of the same user GUI device. Those sequences of digital samples appearing in both the rendered signal and the microphone signal are likely echoes. In one embodiment, the algorithm evaluates the probability that a set of samples consists of near-end speech or an echo. Additional factors evaluated by an algorithm for determining the likelihood that a digital sample is an echo will be apparent to one of ordinary skill in the art upon reading the disclosure of the present invention. These factors are considered to be within the scope of the invention and should not serve to limit the invention only to the factors that are explicitly disclosed herein.

In one embodiment, the algorithm of the present invention determines the likelihood or probability that a digital sample is or is not an echo. In one embodiment, the algorithm of the present invention determines that a digital sample is or is not an echo with a definite degree of certainty. Upon determination that a portion of the audio signal is or is likely to be an echo, the system of the present invention multiplies the corresponding sequence of digital samples by a gain which is either zero or a value close to zero. Conversely, for a portion of the signal determined to be or highly likely to be desired speech of the user, the system of the present invention multiplies the corresponding sequence of digital samples by a gain which is either one or a value close to one. Further, when the determined probability that a portion of the signal is neither high or low (i.e., uncertain), the algorithm is operable to assign a corresponding gain that is a value between one and zero.

In one embodiment, the gain value applied to a portion of the signal with an uncertain probability of being part of the desired speech or an echo is directly correlated to the degree of certainty determined by the algorithm. For example, a high likelihood that a portion of the microphone signal is desired speech is indicated by 75% to 100% likelihood of being desired speech, while a low likelihood is indicated by 0% to 25% likelihood. A first portion of a microphone signal is determined to have 50% likelihood of being desired speech and a second portion of a signal is determined to have 70% likelihood of being desired speech. Therefore, neither the first nor the second portion are determined to have a high or low likelihood of being desired speech. To determine the gain by which to multiply the two portions, the system of the present invention multiplies the first portion by a gain of 0.5 corresponding to a 50% likelihood of being desired speech and the second portion is multiplied by a gain of 0.7 corresponding to a 70% likelihood if being desired speech.

Advantageously, echo suppression in the present invention is achieved in real time or near real time. The present invention also provides for noise cancellation on a client device in real time or near real time. In one embodiment, the system of the present invention suppresses but does not cancel noise generated by the system of the present invention. In one embodiment, the system of the present invention cancels noise generated by the system of the present invention. In one embodiment, the system of the present invention is operable to apply both suppression and cancellation techniques to the audio stream generated by the system of the present invention (i.e., noise, echo, double talk, feedback, etc.). Although the term "suppression" is used throughout the present application for convenience, one of ordinary skill in the art will understand that the present invention is operable to provide echo or noise suppression and/or cancellation where the term "suppression" is utilized unless expressly stated otherwise. In one embodiment, the system of the present invention suppresses echo and mitigates audio identified as double talk. The term "double talk" as used herein refers to an instance when multiple users of the platform speak at once, and the user GUI device of a speaker detects both incoming and outgoing audio.

It is an advantage of the present invention to suppress echo on the client-side of a client-server distributed architecture, as the audio signal generated by the microphone of the client device and the reference signal of the audio are synchronized or near-synchronized on the client device. In contrast, while the reference signal is received immediately by the server, there is a delay in receiving the audio signal of the microphone by the server. This round-trip delay (RTD) is due to the time required to send the microphone audio signal to the server compounded with the time required by the server to acknowledge the microphone audio signal. The RTD is dependent on available network bandwidth and current level of utilization (i.e., network traffic from other users). When the microphone audio signal is eventually received at the server, the reference signal and the microphone audio signal are no longer aligned. Thus, the present invention advantageously eliminates echo on the client-side of the system with increased accuracy in comparison to prior art systems, which suppress echo on the server-side and experience RTD before suppressing the echo of the microphone audio signal.

Further, because the echo is suppressed on the client-side of a client-server distributed architecture, the system of the present invention advantageously minimizes the delay of audio transmission between devices. A codec as described herein and located within the browser of the present invention compresses both the microphone audio signal and the reference signal. The system of the present invention then passes the compressed audio signals through the server. The compressed data is received by a client device of a user receiving the compressed audio signal, and the codec on the receiving device then decompresses the audio data. This reduces transmission time, as the server of the present system does not decompress the audio before transmission to a client device. Thus, the present invention advantageously streamlines audio transmission and reduces delays due to decompression and processing that are common in existing systems which use server-side echo suppression.

The present invention is further operable to suppress the echo of an audio signal before compressing the microphone audio signal and reference signal. Compressing the microphone signal with a speech codec reduces the quality of the signal, which translates to reduced coherence between microphone and reference and results in degradation of the achievable Echo Return Loss Enhancement (ERLE). Suppressing the echo of an audio signal before compression of audio data allows access to the raw, uncompressed microphone audio signal and therefore minimizes the quality reduction present in systems which suppress echo after compressing the audio signal data.

The platform of the present invention is further operable to detect, suppress, and/or cancel double talk. The algorithms of the present invention advantageously allow for detection of double talk and subsequent cancellation and/or suppression of the double talk in order to facilitate audio transmission by a user GUI device. In one embodiment, the platform of the present invention balances the resources available to the server against the quality of the echo suppression to maximize audio quality and facilitate simultaneous communication between multiple devices generating audio.

Echo cancellation is a mathematical subtraction of a sound wave by the addition of a sound wave that is directly out of phase (i.e., the phase is shifted by 180 degrees) with the soundwave to be cancelled. In one embodiment, the system of the present invention does not use echo cancellation methods to cancel or suppress audio within an audio stream. However, in an alternative embodiment, the system of the present invention uses echo cancellation methods to suppress or cancel selected audio within an audio stream. In one embodiment, the system of the present invention determines if echo cancellation or echo suppression techniques should be applied to the audio stream based on the processing capacity of the central processing unit (CPU) of the client device, cloud service, and/or data service. A system determined to have high processing capacity will implement echo cancellation techniques while a system determined to have low processing capacity will implement echo suppression techniques.

In one embodiment, the system of the present invention is operable to suppress both electro acoustic feedback and ambient properties of the environment. Electro acoustic feedback is a result of oscillations within the electronic environment, where audio output is detected by and received by audio input, creating a feedback loop where the electronic oscillations of the audio stream are amplified. For example, a microphone of a user GUI device detects the voice of a user speaking within a room of their house and establishes the baseline audio input as being that of the user's voice. Outside the house of a user, a neighbor begins to mow their lawn. The microphone of the user GUI device receives the input of the lawn mower, and the system of the present invention multiplies the frequency of the audio wave to suppress or eliminate the lawn mower noise. This creates a suppressed audio stream within the browser of the platform of the present invention. The suppressed audio stream is then transmitted to the server and distributed to user GUI devices according to one embodiment of the present invention. In one embodiment, the system of the present invention suppresses electro acoustic feedback without suppressing the ambient properties of the environment (i.e., "noise"). In one embodiment, the system of the present invention suppresses the ambient properties of the environment without suppressing the electro acoustic feedback.

The platform of the present invention is advantageously hardware agnostic. Hardware agnosticism as used herein refers to the lack of discrimination between devices and hardware installed therein. The components of the platform are non-discriminatory in regard to the hardware of a user GUI device used to access the platform, as the platform is cloud based. That is, the microphone, camera, headphones, and other devices and hardware of the user GUI device as well as the specific make, model, and year of production of the underlying hardware of the user GUI device do not alter the connectivity and streaming capabilities of the platform. In one embodiment of the present invention, the platform does not require a software installation or specific software revision level to enable access to the platform via an internet browser of a user GUI device. In one embodiment, the platform of the present invention is operable without the use of headphones, earbuds, earpieces, headsets, or other device for generating audio directly to the ear of a user and detecting user speech without significant acoustic attenuation. In one embodiment of the present invention, the platform is operable to detect the audio generated by a user without the use of headphones, earbuds, earpieces, headsets, or other similar devices.

Figure 2:
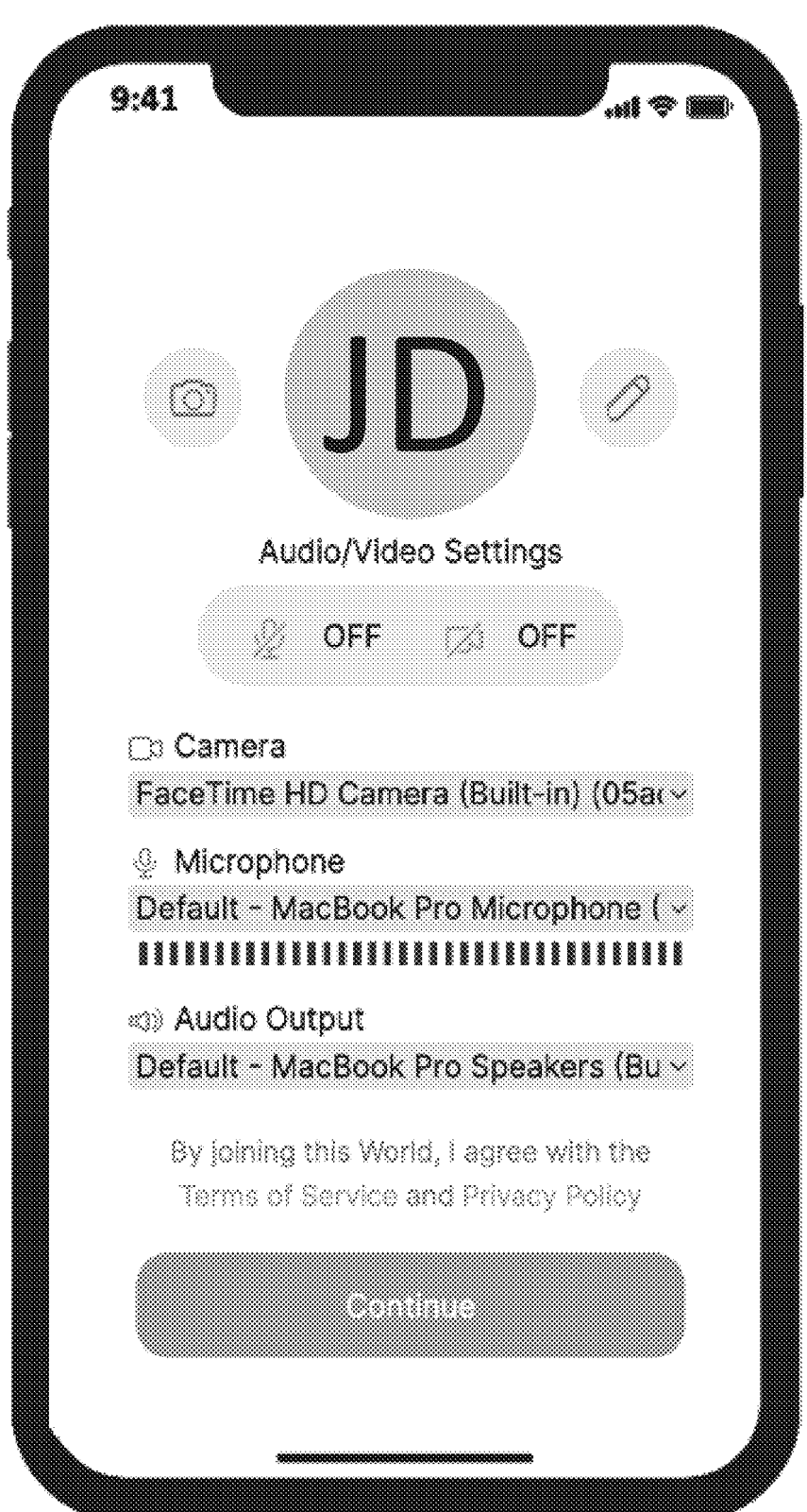
FIG. 2 is an illustrative view of an access portal displayed on a user GUI according to one embodiment of the present invention.

FIG. 2 is an illustrative view of an access portal displayed on a user GUI of a user GUI device according to one embodiment of the present invention. A user GUI receives an input selecting the system of the present invention via an internet browser or other software application configured to access the internet or another communications network. The system of the present invention then generates an access portal and displays the access portal to the interface of the user GUI device. The access portal includes a display of an avatar circle of the user. The avatar circle includes the initials of a user (e.g., "Jane Doe"). Selection of an image capture option displayed beside the avatar circle allows the camera of the device to capture an image to be displayed by the avatar. Selection of a keyboard input option displayed beside the avatar allows the device to receive a selection of letters, characters, symbols, and/or other keyboard inputs to be associated with a name of the user GUI device within the platform. The Audio/Video Settings include an indication of enabling a microphone and/or camera of a user GUI device. The Camera used by the platform is selected from a drop-down menu of available cameras detected by the internet browser. The Microphone used by the platform is selected from a drop-down menu of available microphones for speech and audio transmission detected by the internet browser. The Audio Output used by the platform is selected from a drop-down menu of available audio output devices detected by the internet browser. In one embodiment, the Camera and Microphone on the device or connected to the device are automatically detected by the platform of the present invention and the Camera and Microphone fields are prepopulated on the interface of the GUI device. The access portal further includes a hyperlink to the Terms of Service and Privacy Policy of the platform of the present invention, wherein the GUI device receives a selection to Continue into the platform of the present invention.

In one embodiment, the avatar is an avatar circle. The avatar circle displays an image captured by the GUI device of the user, a live video feed captured by the camera of the device, a keyboard input, or abbreviation of a keyboard input (e.g., initials "JD" of a keyboard input "Jane Doe"). In one embodiment, if a user GUI device receives an indication of video setting to be "Off", the avatar circle will display a keyboard input, or abbreviation of a keyboard input (e.g., initials "JD" of a keyboard input "Jane Doe"). In one embodiment, if a user GUI device receives an indication of video setting to be "Off", the platform of the present invention generates a prompt for capturing an image via the camera of the device and/or entering a keyboard input for display by the avatar circle. In one embodiment, the platform of the present invention generates a prompt for a keyboard input of a name to be used for identification of the avatar within the platform. In one embodiment, the avatar is a virtual representation of a user, including features representative of a user (e.g., facial features, hair color, hair length, customized work uniform). In one embodiment, the avatar is a virtual representation of user input characteristics, including features selected by the user for display by the avatar (e.g., facial features, hair color, hair length, customized work uniform).

Figure 3:
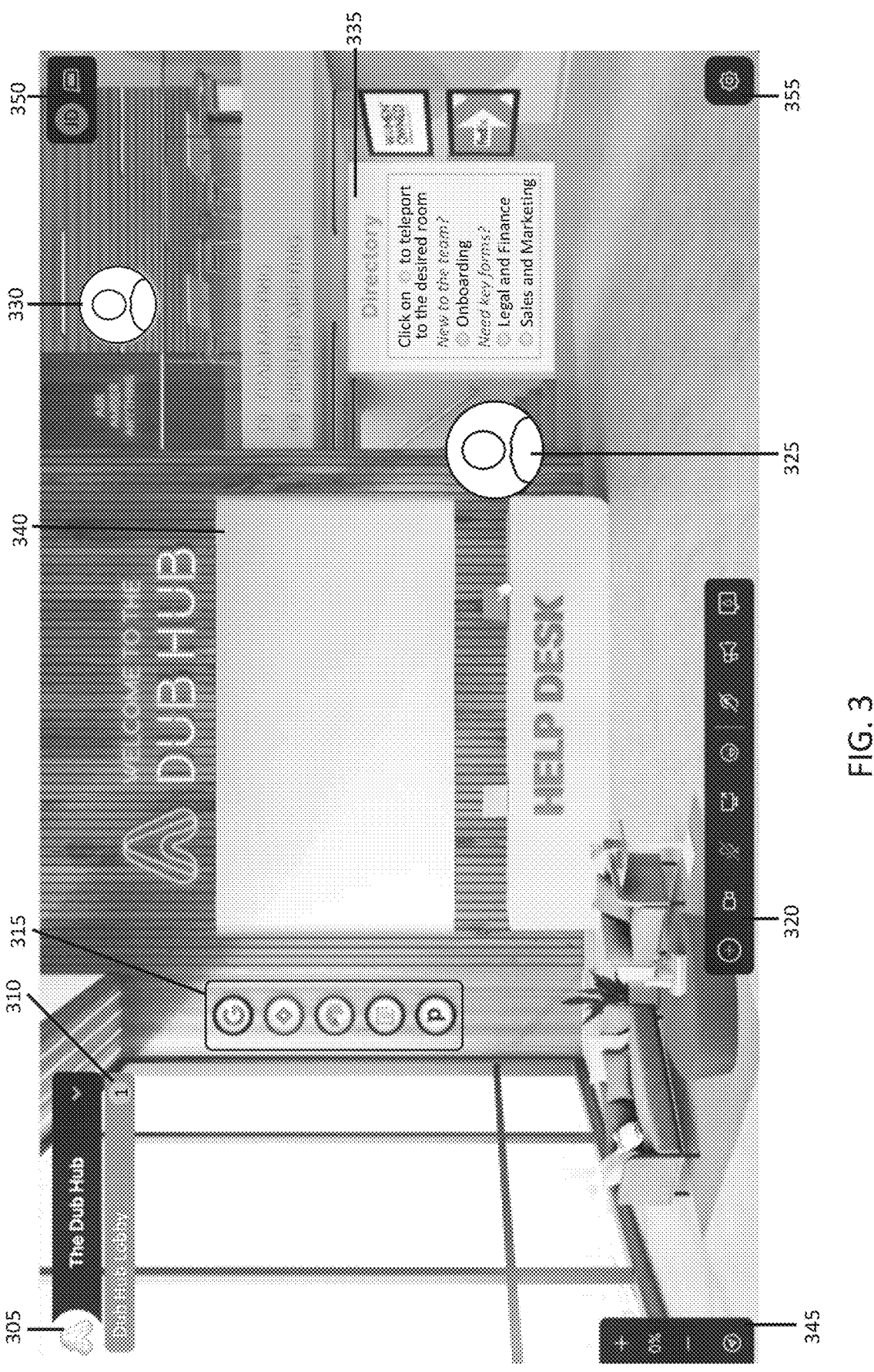
FIG. 3 is an illustrative view of a meeting lobby according to one embodiment of the present invention.

FIG. 3 is an illustrative view of a meeting lobby according to one embodiment of the present invention. The meeting lobby is loaded on a web browser or another software application and displayed on the interface of a user GUI device upon entering the platform of the present invention. A drop-down menu 305 displays a name of the virtual meeting space upon entering the meeting platform. The room identification tile 310 displays the name of the room in which a user avatar is located, including an indication of the number of avatars present within the meeting space. The access tool 315 allows for accessing files from other programs or locations, such as accessing a GOOGLE DOCS file. The file which is accessed within the lobby is operable to be displayed on the customizable space 340. In one embodiment, the customizable space 340 provides an interactive interface for others to access and edit the document in real time or near real time. Access tool 315 is a set of interactable images, where each interactable image contains a hyperlink to an additional browser window. A function shortcut manager 320 located at the bottom of the interface of the GUI device includes shortcuts for controlling functionality and accessibility (e.g., audio input access, video input access, screen sharing, audio output access, override audio output access, notifications, upload a file, customize available shortcuts). A user avatar circle 325 displaying a live video feed of a user via a user camera on a user GUI device or connected to a user GUI device is located within the meeting lobby. A virtual chat or other communications interface is operable to be activated upon selection of an artificial avatar 330. A directory 335 displayed within the lobby includes portals to additional virtual meeting rooms within the virtual meeting space. A customizable display 340 allows a user GUI device to display an uploaded file. A display-size adjustment 345 allows a user GUI device to expand and minimize a view of the displayed meeting platform on the user GUI device. A chat feature 350 allows a user GUI device to send and receive message via the platform, including messages containing text files, image files, documents, videos, and/or hyperlinks. The settings 355 are accessible via the interface of the user GUI device.

The features and functions depicted in FIG. 3 serve as an exemplary display of the platform of the present invention. The tools of the platform of the present invention enable the creation of a variety of features including but not limited to the features depicted in FIG. 3. However, these features should not serve to limit the scope of the present invention. The tools of the platform allow for the creation of a highly customizable virtual meeting space, which advantageously allows each virtual meeting space to be customized to fit the needs of the users associated with the virtual meeting platform.

In one embodiment, the meeting lobby is customizable by the device of an administrator user of a virtual meeting space. Administrator user GUI device as used herein refers to the device of an individual authorized to manage the display and function of a meeting space for internet communication on behalf of a company, business, university, or other organization or group. The administrator user GUI device is recognized upon entry of the virtual meeting space. The display for an administrator user GUI device includes additional features not available on a participant user GUI device (i.e., the device of a user that is not authorized to manage the display and function of a meeting space). For example, a meeting lobby displayed on an administrator device is operable to include a slider for indicating an editing mode. The slider is selected to enable editing of the virtual meeting space. An administrator user GUI device is then operable to design and customize the virtual meeting space. Customizing the virtual meeting space includes but is not limited to uploading an image to be displayed as a background for the meeting space (ex., a traditional office lobby or a scenic display), adding and customizing meeting rooms within the virtual meeting space (e.g., an onboarding room), adding and customizing a directory, creating a chatbot avatar, customizing the display of a virtual meeting lobby, authorizing additional administrator user GUI devices, creating a room capacity to limit the number of user avatars operable to access a room, selecting the shortcut functions that are available to participant user GUI devices, and creating special access rooms that are only accessible by authorized user GUI devices (i.e., administrator users and/or participant user GUI devices that have been authorized to automatically enter the special access room) and/or participant user GUI devices upon input of a verification code.

Administrator user GUI devices are further operable to upload content to various displays within virtual meeting rooms. These displays include but are not limited to a main display and additional displays located throughout the virtual meeting room. Content operable to be uploaded to a display includes but is not limited to JPEG, PNG, GIF, PDF, DOC, DOCX, MP4, MOV, WEBM, HTML, BMP, PPT, PPTX and KEY files. In one embodiment, a participant user GUI device is operable to upload content to a display within a virtual meeting room without submitting a request to the device of an administrator user. In one embodiment, a participant user GUI device is operable to upload content to a display within a virtual meeting room after submitting a request to the device of an administrator user and the device of the administrator user authorizes the upload. In one embodiment, an administrator user GUI device is operable to identify a user GUI device and authorize the participant user GUI device to become an administrator user GUI device (i.e., a temporary administrator user GUI device) for a definite amount of time (e.g., 1 hour, 24 hours, 72 hours, one week, one month, etc.). In one embodiment, the administrator user GUI device receives an input of the length of time a user GUI device is authorized to act as an administrator user GUI device. In one embodiment, the administrator user GUI device receives a selection of a predetermined length of time a user GUI device is authorized to act as an administrator user GUI device (e.g., the system prompts a user to select 1 hour, 24 hours, 72 hours, or one month authorization for a temporary administrator device).

A drop-down menu displays a name of the virtual meeting space upon entering the meeting platform. Upon selection of the drop-down menu by the user GUI device, the menu displays the virtual meeting rooms within the virtual meeting space and the number of avatars within the virtual meeting room. In addition to the drop-down menu for room selection, the room identification tile displays the name of the room in which a user avatar is located (i.e., "Dub Hub Lobby"), including an indication of the number of avatars present within the meeting space.

A function shortcut manager located at the bottom of the interface of the GUI device includes shortcuts for controlling functionality and accessibility. These shortcuts are indicated by visual icons, wherein selection of the icon enables the shortcut. Shortcuts include but are not limited to preventing audio detection by a microphone of a user GUI device; preventing camera access by a camera of a user GUI device; uploading and/or displaying a file including JPEG, PNG, GIF, PDF, DOC, DOCX, MP4, MOV, WEBM, HTML, BMP, PPT, PPTX and KEY files; muting incoming audio stream data; overriding the function to mute incoming audio data on user GUI devices within the virtual meeting room; displaying a reaction (e.g., "applauding" reaction wherein two animated hands appear on/adjacent to the avatar circle and come together to mimic the action of clapping); displaying temporary notifications (e.g., a notification that someone has applauded while you were speaking); and the option to customize the shortcuts that are available to a user, so that as few as zero shortcuts are visible. In one embodiment, the customized shortcut option is available only on an administrator device. The administrator device is operable to alter the display of the function shortcut manager on a participant user GUI to include only a selection of shortcuts. In one embodiment, the customized shortcut option is available only on an administrator device. In one embodiment, the function to override a selection to mute incoming audio data on user GUI devices within the virtual meeting room is only available to an administrator device.

In one embodiment, a virtual meeting room is operable to include a virtual chat or other communications interface. In one embodiment, selection of the virtual chat tool directs a user GUI device to an embedded website with a contact form with contact information for facilitating communication with an additional user GUI device outside the platform of the present invention (i.e., email, phone communication, physical address, etc.). In one embodiment, the virtual chat or communication interface is operable to be activated upon selection of an artificial avatar. An artificial avatar as used herein refers to an avatar of the present invention, wherein selection of the avatar enables an associated response engine. The response engine incorporates a conversational decision tree in communication with user GUI devices. The artificial avatar is not associated with a user GUI device, but rather is a platform-based response engine. In one embodiment, selection of the artificial avatar enables a communication portal between the user GUI device and the response engine.

The response engine is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MD), and/or natural language processing (NLP). The response engine is operable to use any of the aforementioned learning techniques alone or in combination. In one embodiment, the response engine of the present invention uses the aforementioned learning techniques alone or in combination to construct and/or select a preconstructed response to a prompt.

Further, the response engine is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The response engine is preferably operable to recommend and/or perform actions based on historical data, external data sources, ML, AI, NNs, and/or other learning techniques. The response engine is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Figure 4:
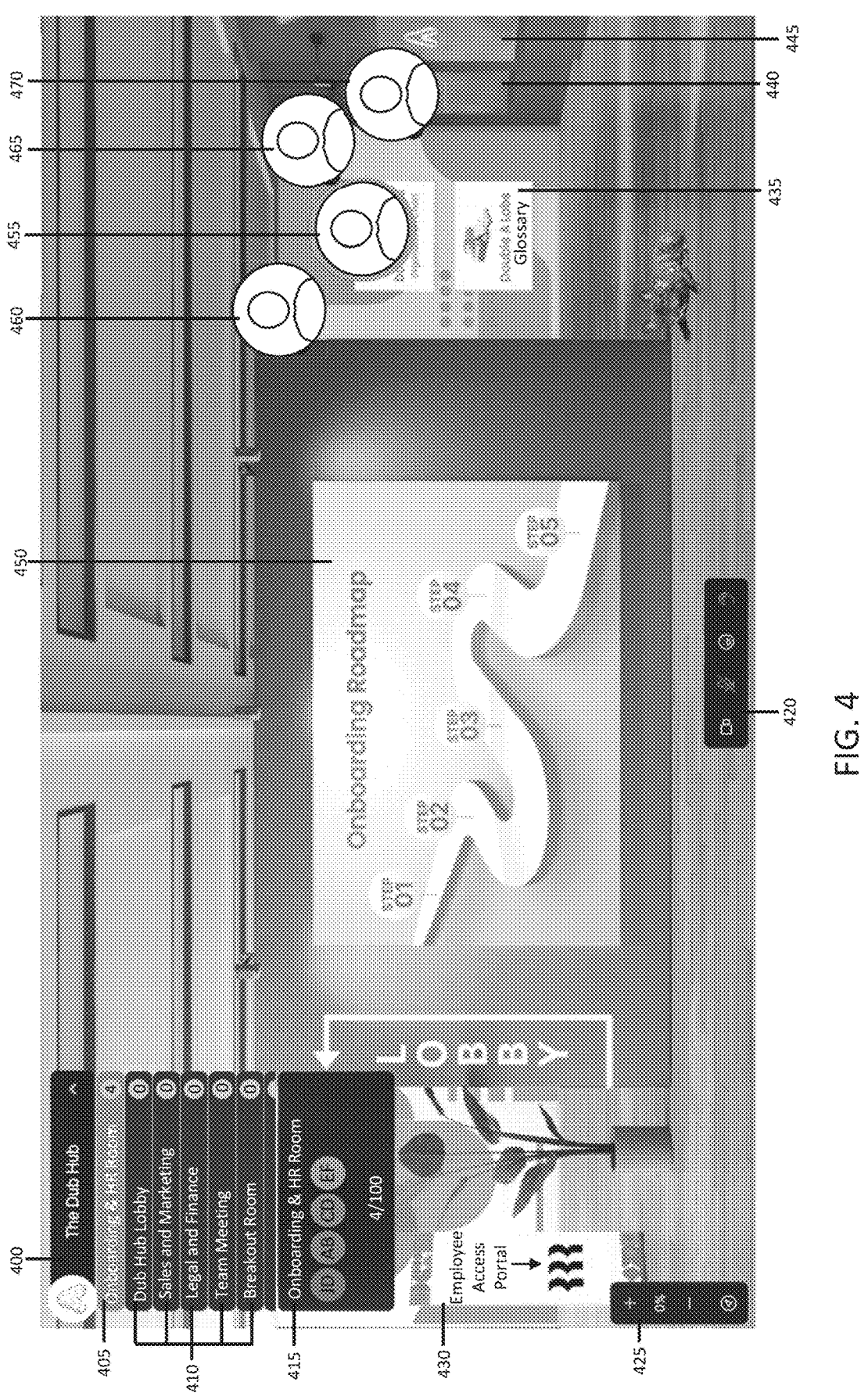
FIG. 4 is an illustrative view of a customized meeting room according to one embodiment of the present invention.

FIG. 4 is an illustrative view of a customized meeting room according to one embodiment of the present invention. An expanded drop-down menu 400 displays a name of the virtual meeting space. The expanded menu 400 includes room identification tiles 405, 410. Room identification tiles 405, 410 include an indication of the number of avatars present within the meeting space. A highlighted room identification title 405 indicates the room in which the avatar of the user GUI device is located as well as the total number of avatars located within the meeting room. Room identification tiles 410 list the rooms included within the virtual meeting space, wherein selection of the room identification tile transports a user avatar to that room. A room status indicator 415 includes the title of the room as well as the number of avatars within the room, the limit on the number of avatars operable to enter the room, and initial icons displaying the initials of the members within the virtual meeting room (ex., "JD"). A display-size adjustment 425 allows a user GUI device to expand and minimize a view of the displayed meeting platform. A function shortcut manager 420 is displayed at the bottom of a user GUI and includes shortcut functions according to an embodiment of the present invention. A customizable room display 430 contains a link to an Employee Access Portal, while another customizable room display 435 includes a link to a file including a Glossary. Additional customizable room displays 440,445 are created to appear as part of the background (ex., banners hanging on a wall). The user GUI device receives a selection of a customizable room display 440, 445 and is directed to a file containing additional files (e.g., employee handbook and culture deck). A customizable presentation display 450 displays content uploaded by an administrator user GUI device for display to the user GUI devices within the meeting room. The display further includes an administrator user avatar 455 and participant user avatars 460, 465, 470 within the virtual meeting space.

Figure 5:
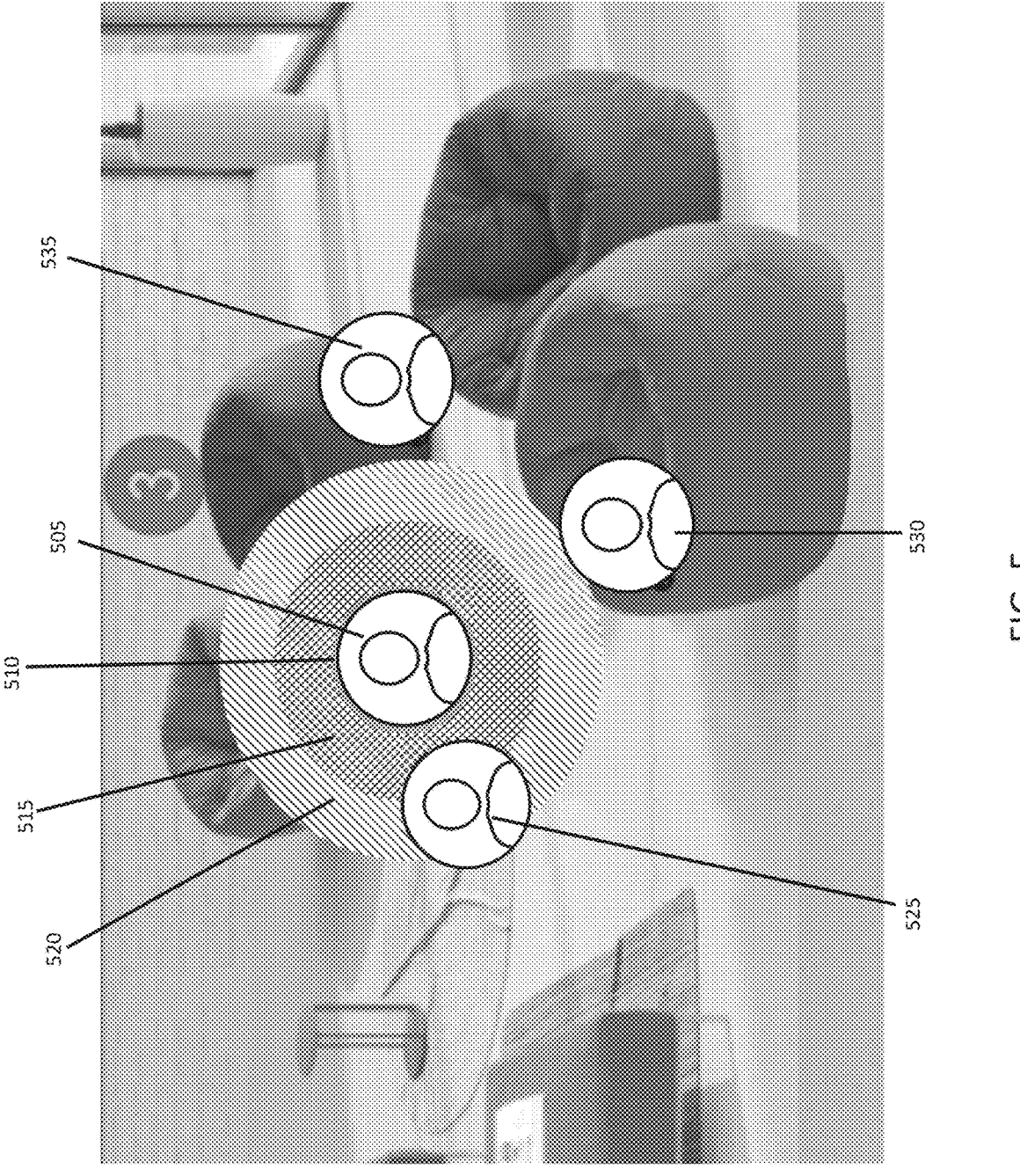
FIG. 5 is an illustrative view of a spatial audio feature according to one embodiment of the presentation.

FIG. 5 is an illustrative view of a spatial audio feature according to one embodiment of the presentation. The spatial audio feature provides for an online experience that is analogous to interactions in the physical world, allowing for private conversations within a virtual space based on physical proximity of the avatars within the virtual space. The user avatar 505 corresponding to the user GUI device transmitting audio to the device of additional users represented by avatars 525, 530, 535 within the virtual meeting room is indicated by a highlight 510 surrounding the user avatar 505. Audio buffer rings 515, 520 surround the avatar 505 corresponding to the user GUI device transmitting audio. Audio buffer rings determine the volume of the audio transmitted from the user GUI device generating an audio based on the proximity of the avatars 525, 530, 535 to the avatar 505 corresponding to the user GUI device transmitting audio, and whether the devices corresponding to the avatars 525, 530, 535 receive audio from the avatar 505 corresponding to the user GUI device transmitting audio receive audio from the user GUI device transmitting audio at all.

In one embodiment, the platform of the present invention features audio volume control as a function of proximity of one avatar to another avatar. The proximity based audio volume control operates on the audio stream received by a user device. The avatar corresponding to a user GUI device generating an audio stream is surrounded by a plurality of audio buffer rings. The platform of the present invention detects the presence of an avatar within the audio buffer rings and determines the appropriate volume of the audio stream output to the device of the user corresponding to the user avatar. For example, FIG. 5 depicts an avatar 530 which overlaps with the outer audio buffer ring 520 and an avatar 525 within the inner audio buffer ring 515. Audio generated by the user GUI device corresponding to avatar 505 is output at the GUI device of a user corresponding to the avatar 530 within the outer ring at fifty percent volume (i.e., multiplied by a gain of 0.5), where audio output at the device of a user corresponding to an avatar 525 within the inner circle is output at one hundred percent volume (i.e., multiplied by a gain of 1). The percentages of the output volume and the number of associated rings should not be considered limiting, as a range of volume ranges are operable for implementation via the platform of the present invention. In one embodiment, there are three audio buffer rings surrounding a user avatar. In one embodiment, there are four audio buffer rings. In one embodiment, audio buffer rings are not determined by an input number of rings but by the percentage of audio output volume (e.g., a new ring is created at thirty percent, eighty percent, and 100 percent volume). In one embodiment, audio is output at the user GUI device corresponding to an avatar that does not fall within an audio buffer ring (ex., avatar 435 of FIG. 4) at zero percent volume (i.e., multiplied by a gain of 0) compared to the input volume.

It should be noted that audio volume control as a function of proximity and echo suppression are two separate functions of the present invention that are applied to the audio stream. Echo suppression is applied at the client-side before compression and transmission of the audio stream to the server and is therefore independent from proximity based audio volume control. That is, echo suppression is a gain modification method for audio stream samples being transmitted from a user GUI device while audio volume control as a function of proximity is a gain modification method for audio stream samples being received by a user GUI device.

In one embodiment, an avatar is granted a speaker privilege, such that the audio from the device associated with the avatar is transmitted to all other avatars in a virtual space. In the event that there are multiple rooms within an overarching virtual space, the present invention is operable to provide for the audio from the avatar with the speaker privilege to be transmitted to avatars within the multiple rooms within the overarching virtual space. In another embodiment, the audio from the avatar which has been granted speaker privileges is amplified compared to audio associated with other avatars. By way of example and not limitation, audio from the avatar which has been granted speaker privilege is multiplied by a gain of 1.5 compared to a baseline audio for other avatars. In another embodiment, multiple avatars are granted speaker privileges. By providing speaker privileges to one avatar or multiple avatars, the present invention is operable to provide a virtual environment similar to a speaking event in the physical world. Speakers typically have a microphone or speak louder than members of an audience. By providing speaker functionality in combination with echo suppression, the present invention enables the prioritization of an audio stream from participants with speaker privilege, such that the participant audio is transmitted and audio from additional sources (e.g., other participants or acoustic feedback) is suppressed.

The present invention is also operable to grant emergency rights to an avatar in the event that an urgent or important announcement needs to be made, and provides for muting of audio from all other avatars or a significant reduction in volume of audio from all other avatars upon activation of the emergency rights to the selected avatar. Additionally or alternatively, the audio associated with the avatar with emergency rights is amplified.

In one embodiment, decision making regarding the volume of audio output occurs on the server-side of a client-server distributed architecture. For example, the server-side of the platform is operable to amplify the speaker rights of one user GUI device over another user GUI device. One of ordinary skill in the art will appreciate that the combination of client-side functionality and server-side functionality constitutes a hybrid model for data management and decision making. For example, in one embodiment echo suppression is accomplished on the client side of the client-server network and decision making regarding special audio volume is performed on the server-side of the client-server network. In one embodiment, the platform of the present invention is a hybrid of client-side and server-side decision making.

Although the present invention is primarily described with respect to a web-browser based virtual meeting space, the present invention is also operable to be utilized in a variety of other online environments. In one embodiment, the echo suppression, audio amplification or suppression, and other features described herein are implemented in an immersive virtual space, metaverse, or Web 3.0 environment. In another embodiment, the present invention is operable to be utilized in a gaming environment, such as a massively multiplayer online games (MMOs). The present invention is operable to provide audio and video or other data streams in these environments.

In one embodiment, the data stream including audio and video data is compressed via a codec. In one embodiment, the codec is operable to compress data at the client-side of a client-server distributed architecture. As audio and video stream data is collected respectively by the microphone and camera of a first user GUI device, the data stream is converted from an HTML canvas file into an array of binary digits, such as 8-bit unsigned integers. The array is passed into the codec. The codec converts the array into a bitmap (i.e., a grid format of color blocks) with quantized red, blue, green (RGB) values. The codec also removes the alpha channel of the array. As used herein, "alpha channel" refers to the color component of video data that determines the degree of transparency for an RGB channel. A pre-compression length of the bitmap is determined. The bitmap is then passed through a repetition-detection algorithm, such as LZ4, to detect repeating frames within the converted bitmap. The algorithm stores repetitive frames (i.e., frames wherein the RGB values are identical to that of the previous frame) as a single value to create a compressed data stream. The compressed data stream and associated pre-compression length are then transmitted to the server via an end-to-end communication protocol. The server receives the compressed data stream and associated pre-compression length and deposits the compressed data stream and associated pre-compression length into the cache of a server.

A second user GUI device accesses the compressed data stream and associated pre-compression length from the cache of the server via the end-to-end communication protocol. The data is transmitted to the browser of the second user GUI device, where the codec is active within the browser. The repetition-detection algorithm within the codec of the second user GUI device (i.e., on the client-side of a client-server distributed architecture) reads the pre-compression length of the bitmap to determine a point within the compressed data stream to begin decompressing the data. The decompressed data stream is dequantized to recreate the bitmap. Upon recreation of the bitmap, the alpha channel is added to the red, green, blue values to create RGBA values for the bitmap. The RGBA bitmap is then applied to the avatar of the first user GUI device appearing on the GUI device of the second user.

In one embodiment, the codec of the present invention includes a time-based interval for verifying the age of a frame (i.e., whether the frame is older than a millisecond). In one embodiment, the interval runs every millisecond. In one embodiment, the interval runs every millisecond plus an interval value. In one embodiment, the receipt of a compressed data stream by the cache of the server generates a timestamp for verifying the age of a frame (i.e., whether the frame is older than a millisecond).

Figure 6:
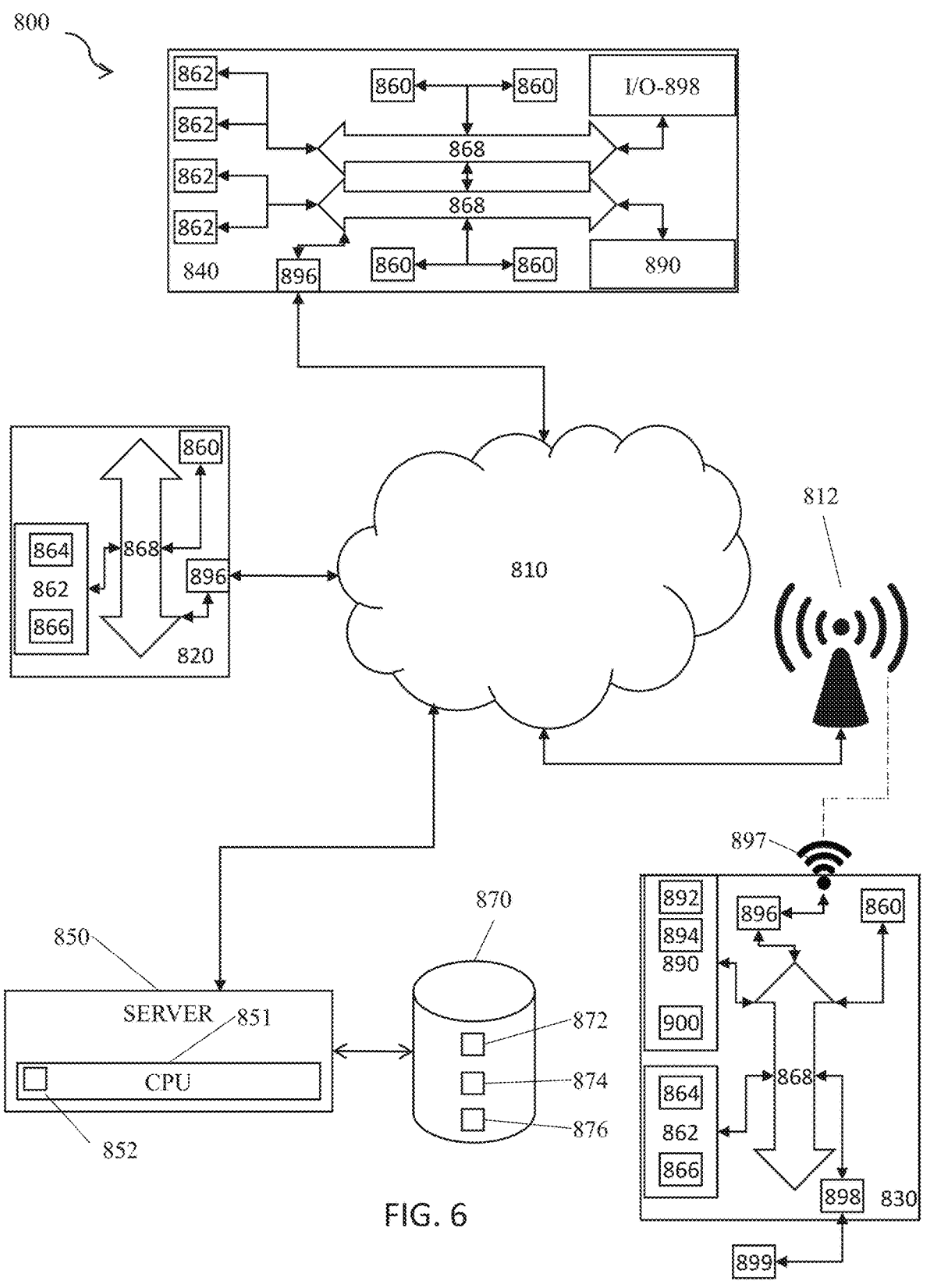
FIG. 6 is a schematic diagram of a system of the present invention.

The use of the codec is advantageous in comparison to existing peer-to-peer data distribution systems, as the data stream of a user GUI device is transmitted to a server, and the server transmits the received data stream to user GUI devices within the browser. Because of this, the system of the present invention requires significantly less processing power in comparison to existing peer-to-peer data distribution systems. Further, the time-based interval for age verification of a frame limits the transmission of old frames and advantageously enhances the real-time transmission of data. Further, the use of the codec enables quality control of the platform of the present invention through a single back end control center, enabling optimized efficiency assurance. FIG. 6 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICRO-WAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joysticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 6, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 6, is operable to include other components that are not explicitly shown in FIG. 6, or is operable to utilize an architecture completely different than that shown in FIG. 6. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A hardware agnostic system for suppression of an echo within a virtual meeting platform, comprising:
   a server with a server processer, a server memory with a server database, and an operating system;
   a plurality of client devices, wherein each client device of the plurality of client devices comprises a client processor and a client memory with a client database;
   wherein the server hosts a platform with a graphic user interface (GUI) and a client-server computing infrastructure;
   wherein each client device of the plurality of client devices is configured to access the server via a web browser, wherein upon accessing the server via the web browser each client device of the plurality of client devices is configured to access the platform;
   wherein the server establishes a connection between each client device of the plurality of client devices via the platform;

wherein the platform receives an environmental audio input from a first client device of the plurality of client devices and converts the environmental audio input into a reference signal on a client side of the client-server computing infrastructure;
   wherein the platform receives a microphone audio input from the first client device and converts the microphone audio input into a microphone audio signal on the client side of the client-server computing infrastructure;
   wherein the platform compares the reference signal to the microphone audio signal and identifies at least one derivation between the reference signal and the microphone audio signal on the client side of the client-server computing infrastructure;
   wherein the platform identifies a subset of digital samples of the at least one derivation and a gain value, wherein the platform multiplies the subset of digital samples by the gain value on the client side of the client-server computing infrastructure to produce a suppressed audio stream;
   wherein the platform transmits the suppressed audio stream from the client side of the client-server computing infrastructure to a server side of the client-server computing infrastructure;
   wherein the server transmits the suppressed audio stream to a second client device of the plurality of client devices; and
   wherein a first avatar is generated upon the first client device accessing the platform, wherein a second avatar is generated upon the second client device accessing the platform, wherein the first avatar and the second avatar are displayed on the GUI of the platform, wherein a volume level for the suppressed audio stream is determined based on a displayed proximity of the first avatar to the second avatar.

2. The system of claim 1, wherein the platform identifies the subset of digital samples of the microphone audio input and the gain value and multiplies the subset of digital samples by the gain value in real time.

3. The system of claim 1, wherein the platform does not implement a peer-to-peer computing infrastructure.

4. The system of claim 1, wherein the platform further comprises a codec, wherein the codec compresses the suppressed audio stream on the client side of the client-server computing infrastructure, wherein a compressed suppressed audio stream is transmitted to the server side of the client-server computing infrastructure, wherein the compressed suppressed audio stream is transmitted from the server to the second client device on the client side of the client-server computing infrastructure, wherein the codec decompresses the compressed suppressed audio stream on the client side of the client-server computing infrastructure.

5. The system of claim 1, wherein the platform is configured to identify a soundwave of the microphone audio signal and/or the reference signal, wherein the platform is configured to add a shifted soundwave to the microphone audio signal and/or the reference signal to produce a cancelled audio stream, wherein the shifted soundwave is directly out of phase with the soundwave.

6. The system of claim 1, wherein the platform implements an end-to-end encryption code, wherein the end-to-end encryption code encrypts the suppressed audio stream on the client side of the client-server computing infrastructure, wherein an encrypted suppressed audio stream is transmitted to the server side of the client-server computing infrastructure, wherein the encrypted suppressed audio stream is transmitted from the server to the second client device on the client side of the client-server computing infrastructure, wherein the end-to-end encryption code decrypts the encrypted suppressed audio stream on the client side of the client-server computing infrastructure.

7. The system of claim 1, wherein the server is a cloud-based server or a designated physical server.

8. The system of claim 1, wherein the plurality of client devices comprises 10,000 client devices.

9. A hardware agnostic method for suppression of an echo within a virtual meeting platform, comprising:

a server hosting a platform with a graphic user interface (GUI) and a client-server computing infrastructure, wherein the server comprises a server processer, a server memory with a server database, and an operating system;

a plurality of client devices accessing the server via a web browser, wherein each client device of the plurality of client devices comprises a client processor and a client memory with a client database;

the server establishing a connection between each client device of the plurality of client devices via the platform;

a first client device of the plurality of client devices accessing the platform, wherein a first avatar is generated by the platform;

a second client device of the plurality of client devices accessing the platform, wherein a second avatar is generated by the platform;

the platform displaying the first avatar and the second avatar on the GUI of the platform;

the platform receiving an environmental audio input from a first client device of the plurality of client devices and converting the environmental audio input into a reference signal on a client side of the client-server computing infrastructure;

the platform receiving a microphone audio input from the first client device and converting the microphone audio input into a microphone audio signal on the client side of the client-server computing infrastructure;

the platform comparing the reference signal to the microphone audio signal and identifying at least one derivation between the reference signal and the microphone audio signal on the client side of the client-server computing infrastructure;

the platform identifying a subset of digital samples of the at least one derivation and a gain value;

the platform multiplying the subset of digital samples by the gain value on the client side of the client-server computing infrastructure to produce a suppressed audio stream;

the platform transmitting the suppressed audio stream from the client side of the client-server computing infrastructure to a server side of the client-server computing infrastructure;

the server transmitting the suppressed audio stream to a second client device of the plurality of client devices; and the platform determining a volume level for the suppressed audio stream based on a displayed proximity of the first avatar to the second avatar.

10. The method of claim 9, further comprising the platform identifying the subset of digital samples of the microphone audio input and the gain value and multiplying the subset of digital samples by the gain value in real time.

11. The method of claim 9, further comprising a codec of the platform compressing the suppressed audio stream on the client side of the client-server computing infrastructure, wherein a compressed suppressed audio stream is transmitted to the server side of the client- server computing infrastructure, wherein the compressed suppressed audio stream is transmitted from the server to the second client device on the client side of the client-server computing infrastructure, wherein the codec decompresses the compressed suppressed audio stream on the client side of the client-server computing infrastructure.

12. The method of claim 9, further comprising the platform identifying a soundwave of the microphone audio signal and/or the reference signal, wherein the platform is configured to add a shifted soundwave to the microphone audio signal and/or the reference signal to produce a cancelled audio stream, wherein the shifted soundwave is directly out of phase with the soundwave.

13. The method of claim 9, further comprising the platform implementing a first audio buffer ring and a second audio buffer ring around the first avatar, wherein the second avatar is displayed within the first audio buffer ring and a third avatar corresponding to a third client device is displayed within the second audio buffer ring, wherein the suppressed audio stream is transmitted to the second client device at an initial volume and the suppressed audio stream is transmitted to the third client device at a decreased volume.

14. The method of claim 9, further comprising the first client device moving the first avatar and the second client device moving the second avatar, wherein the displayed proximity of the first avatar to the second avatar is increased and the volume level of the suppressed audio stream is increased or the displayed proximity of the first avatar to the second avatar is decreased and the volume level of the suppressed audio stream is decreased.

* * * * *